United States Patent
Glover

Patent Number: 5,098,133
Date of Patent: Mar. 24, 1992

[54] TUBE COUPLING WITH SWIVELABLE PISTON

[75] Inventor: Jeffrey Glover, Cincinnati, Ohio

[73] Assignee: General Electric Company, Lynn, Mass.

[21] Appl. No.: 473,217

[22] Filed: Jan. 31, 1990

[51] Int. Cl.⁵ .............................................. F16L 9/14
[52] U.S. Cl. ..................................... 285/23; 285/141; 285/302; 285/321; 285/338; 285/39; 285/231; 285/276
[58] Field of Search ................. 285/23, 231, 275, 276, 285/39, 302, 321, 339, 923, 224, 187, 141, 338, 345; 277/207 A, 216, 217, 220, 222

[56] References Cited

U.S. PATENT DOCUMENTS

| | | | |
|---|---|---|---|
| 577,413 | 2/1897 | Bray | 285/39 X |
| 1,790,317 | 1/1927 | Mueller | 285/338 |
| 2,410,027 | 3/1944 | Guildford | 285/339 |
| 3,641,766 | 2/1972 | Uehling | 60/262 |
| 4,019,320 | 4/1977 | Redinger, Jr. et al. | 60/226 |
| 4,079,968 | 3/1978 | Wilkins, Jr. | 285/187 |
| 4,214,851 | 7/1980 | Tuley et al. | 415/115 |
| 4,230,436 | 10/1980 | Davison | 415/1 |
| 4,268,221 | 5/1981 | Monsarrat et al. | 415/116 |
| 4,279,123 | 7/1981 | Griffin et al. | 60/226 |
| 4,329,114 | 5/1982 | Johnston et al. | 415/145 |
| 4,475,739 | 10/1984 | Nakajima et al. | 277/216 |
| 4,525,998 | 7/1985 | Schwarz | 60/226 |
| 4,548,427 | 10/1985 | Press et al. | 285/321 X |
| 4,553,901 | 11/1985 | Laurello | 415/138 |
| 4,570,946 | 2/1986 | Tsuchiya et al. | 277/216 |
| 4,575,107 | 3/1986 | Umegawa | 277/222 |
| 4,613,158 | 9/1986 | Ekman | 285/339 X |
| 4,643,638 | 2/1987 | Laurello | 415/136 |
| 4,958,859 | 9/1990 | Konrad et al. | 285/93 |

OTHER PUBLICATIONS

Oberg et al., Machinery's Handbook, 1974, p. 544, Mech. Eng. Ref. Book, 19th Ed.

*Primary Examiner*—Peter M. Cuomo
*Assistant Examiner*—Timothy Aberle
*Attorney, Agent, or Firm*—Nathan D. Herkamp; Jerome C. Squillaro

[57] ABSTRACT

A coupling for joining first and second channels in fluid communication includes a tubular housing having a first section including a wear surface, and a second section for being removably joined in fluid communication with the second channel. A first fitting includes a flange for being joined in fluid communication with the first channel, and an integral piston including a piston ring disposed in contact with the wear surface for forming a seal therewith. Differential movement between the housing and the piston is accommodated while maintaining a seal with the piston ring.

20 Claims, 2 Drawing Sheets

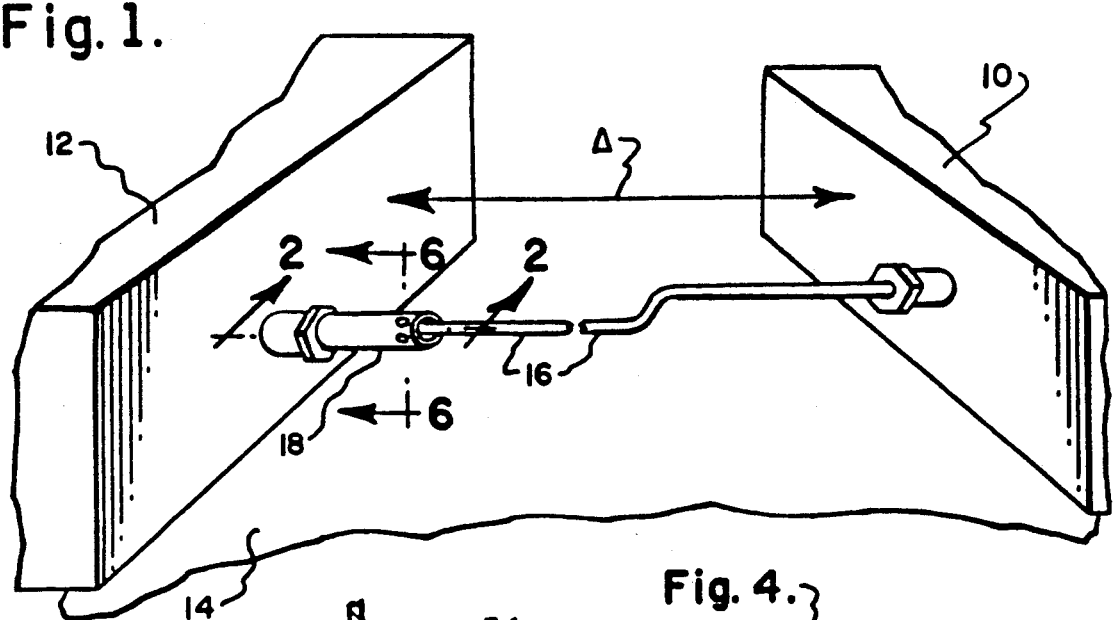
Fig. 1.
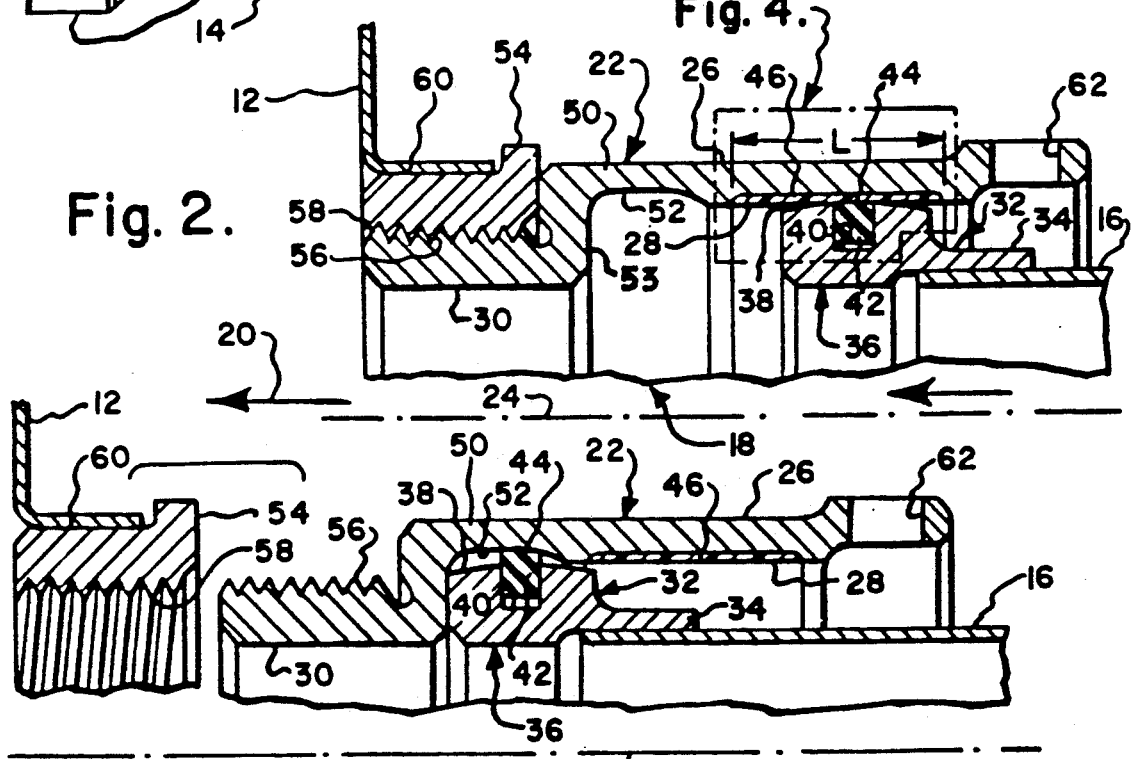
Fig. 2.
Fig. 3.
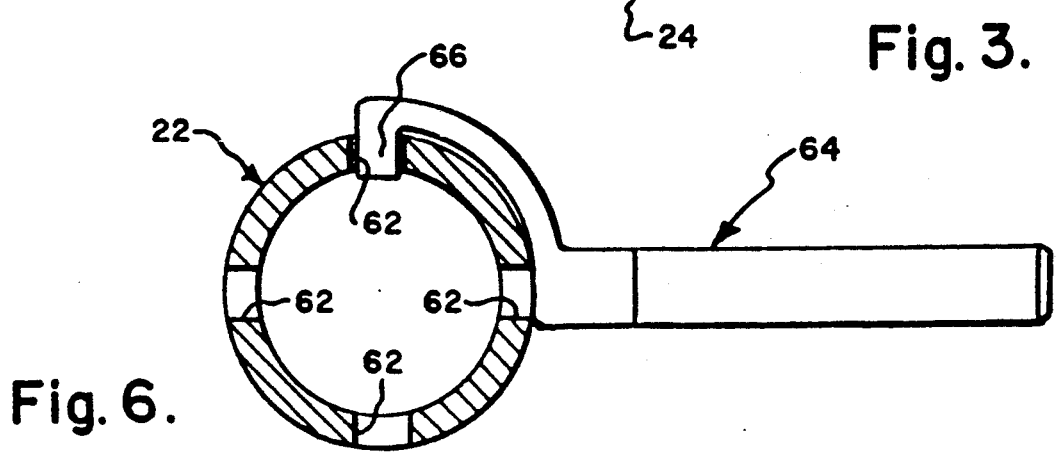
Fig. 6.

5,098,133

TUBE COUPLING WITH SWIVELABLE PISTON

TECHNICAL FIELD

The present invention relates generally to gas turbine engines, and, more specifically, to couplings for tubes channeling fluid flow between components in the gas turbine engine.

BACKGROUND OF THE INVENTION

In a conventional gas turbine engine, tubes are provided for channeling fluid such as fuel and air between components in the engine. Air tubes, for example, may be used for channeling compressor bleed air to selected engine components for providing cooling air.

A gas turbine engine operates at relatively high temperatures wherein both hot combustion gases and cool cooling air are channeled. Accordingly, differential temperatures are found in the gas turbine engine which result in differential thermal movement of adjacent turbine components. Furthermore, the engine includes rotating shafts and blades which generate vibratory forces on the engine components.

Accordingly, couplings used for joining fluid conduits to engine components are subject to differential thermal movement between adjacent components and vibratory forces in axial and transverse directions. Furthermore, where conduits are to join stationary adjacent components, the coupling should allow for installation and removal of the conduits without moving the stationary adjacent components.

Conventional couplings effective for accommodating differential thermal movement and vibratory forces while still maintaining acceptable seals for containing fluid flow are relatively complex, heavy, and expensive. For example, a metallic flexible bellows is known for providing a leak proof seal while accommodating axial and transverse movements. However, bellows are relatively complex and require considerable design and testing to ensure adequate durability and life in service in a gas turbine engine.

OBJECTS OF THE INVENTION

Accordingly, one object of the present invention is to provide a new and improved tube coupling.

Another object of the present invention is to provide a new and improved tube coupling for use in a gas turbine engine.

Another object of the present invention is to provide a tube coupling effective for accommodating differential thermal movement between adjacent components.

Another object of the present invention is to provide a new and improved tube coupling which is relatively simple and lightweight.

Another object of the present invention is to provide a new and improved tube coupling which provides an effective seal for containing fluid channeled therethrough while accommodating axial and transverse relative movement.

DISCLOSURE OF INVENTION

A coupling for joining first and second channels in fluid communication includes a tubular housing having a first section including a wear surface, and a second section for being removably joined in fluid communication with the second channel. A first fitting includes a flange for being joined in fluid communication with the first channel, and an integral piston including a piston ring disposed in contact with the wear surface for forming a seal therewith. Differential movement between the housing and the piston is accommodated while maintaining a seal with the piston ring.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

FIG. 1 is a schematic representation of adjacent fluid channels joined by a conduit including a coupling in accordance with one embodiment of the present invention.

FIG. 2 is a transverse sectional view of an installed coupling in accordance with one embodiment of the present invention taken along line 2—2 in FIG. 1.

FIG. 3 is a transverse sectional view of the coupling illustrated in FIG. 1 shown disassembled from one of the fluid channels.

FIG. 6 is a partly sectional, end view of the tube coupling housing illustrated in FIG. 1 taken along line 6—6, and including a wrenching tool for rotating the housing.

MODE(S) FOR CARRYING OUT THE INVENTION

Figure 4:
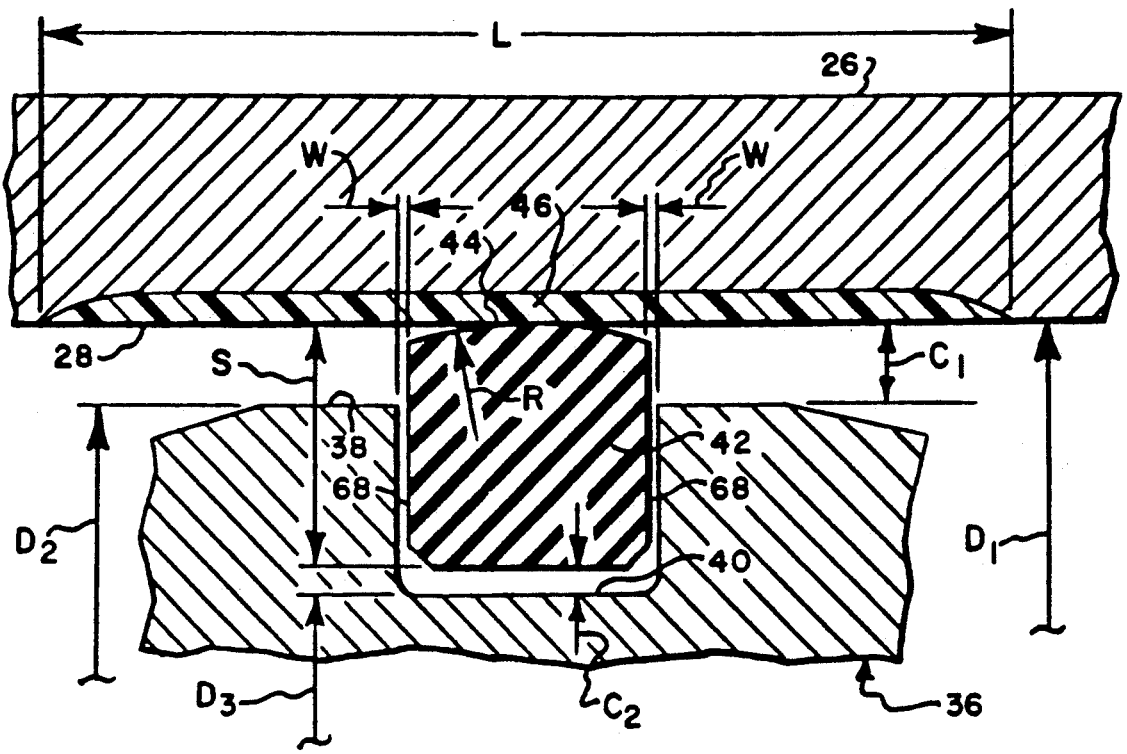
FIG. 4 is an enlarged view of a portion of the tubing coupling illustrated in FIG. 2 in accordance with one embodiment of the present invention illustrating a piston, piston ring, and adjacent housing.

Illustrated in FIG. 1 is a schematic representation of a first fluid channel 10 disposed adjacent to and spaced from a second fluid channel 12. The first and second channels 10 and 12 may be in the form of plenums having compressed air, with both the first and second channels 10 and 12 being conventionally fixedly secured to a gas turbine engine casing 14 (only a portion of which is shown). In an exemplary embodiment, the channels 10 and 12 form part of an active clearance control system in a gas turbine engine.

In this exemplary embodiment, a tube, or channel, 16 is disposed in fluid communication between the first and second channels 10 and 12 for channeling therebetween a relatively low pressure fluid such as compressor bleed air. The tube 16 is joined to the first channel 10 by a conventional fitting, or may be directly brazed thereto, for example. The tube 16 is also joined to the second channel 12 by a tube coupling 18 in accordance with a preferred, exemplary embodiment of the present invention.

Illustrated in more particularity in FIG. 2 is the tube coupling 18 shown assembled between the second channel 12 and the tube 16. The coupling 18 is effective for joining the tube 16 in flow communication with the second channel 12 for channeling a fluid 20, such as compressor air, from the first channel 10 and into the second channel 12 through the tube 16. The coupling 18 includes a tubular housing, or wear sleeve, 22 having a longitudinal centerline axis 24. The housing 22 includes a tubular first section 26 having an annular, cylindrical, radially inwardly facing wear resistant surface 28, and a tubular second section 30 for being removably joined in fluid communication with the second channel 12.

The coupling 18 also includes a tubular first fitting 32 which has an axially extending, annular first flange 34 for being suitably joined in fluid communication with the first channel 10 by the tube 16. In this exemplary embodiment, the flange 34 is brazed or welded to the tube 16 for providing a leak proof sealed joint therewith. In alternate embodiments of the invention, the first flange 34 could also be threaded to the tube, for example. The first fitting 32 also includes a tubular piston 36, preferably integral with the first flange 34, which has a radially outer surface 38. A generally U-shaped, annular retaining groove 40 extends from the outer surface 38 into the piston 36 and circumferentially around the piston 36. An annular piston ring 42 is slideably disposed in the piston groove 40 and includes an outer surface 44. The piston 36 is disposed radially inwardly of the wear surface 28 so that the piston ring outer surface 44 contacts the wear surface 28 for forming a seal therewith.

Referring to both FIGS. 2 and 4, the housing first section 26 and the wear surface 28 are predeterminately sized to allow the piston ring 42 to slide on the wear surface 28 over a predetermined axial range L parallel to the centerline axis 24 for accommodating relative axial movement between the first and second channels 10 and 12. More specifically, and as illustrated in FIG. 1, the first and second channels 10 and 12 in the gas turbine engine 14 are subject to differential thermal movement $\Delta$ which may be due to thermal expansion or contraction between the first and second channels 10 and 12. The differential movement $\Delta$ is accommodated by the tube coupling 18 in order to reduce or prevent undesirable loading of the tube 16 by tension, compression, and/or bending. The differential movement $\Delta$ may be accommodated in whole by a single tube coupling 18 or may be accommodated collectively by two tube couplings 18 disposed on opposite ends of the tube 16. As illustrated in FIGS. 2 and 4, any desired amount of the differential axial movement $\Delta$ may be accommodated by the predetermined axial range L in tube coupling 18. The housing first section 26 is axially sized to accommodate the wear surface 28 extending axially for the predetermined range L. As illustrated, the piston ring 42 may be initially axially disposed centrally to the wear surface 28 to allow for generally equal amounts of axial movement in either axial direction (left or right as illustrated in FIG. 4) within the range L.

In the preferred embodiment, the wear surface 28 is in the form of a wear coating 46 preferably recessed into the housing first section 26. The wear coating 46 may be formed from commercially available Tribaloy T800, or any other conventional coating for providing wear resistance for reducing wear between the wear surface 28 and the piston ring 42. The piston ring 42 is preferably made from a cobalt based alloy such as commercially available L605 for improved wear resistance. The ring outer surface 44 preferably has a surface finish of about 32 microinches or less, and the wear surface 28 preferably has a surface finish of abut 63 microinches or less for these exemplary materials.

As illustrated in FIG. 4, the wear surface 28, piston 36, piston groove 40, and piston ring 42 are sized for allowing contact only of the piston ring 42, i.e., ring outer surface 44, with the wear surface 28. More specifically, the housing first section 26 has an inside diameter $D_1$ at the wear surface 28 and the piston 42 has an outside diameter $D_2$. The piston retaining groove 40 has an inside diameter at its base, $D_3$ and the piston ring 42 has a radial thickness S. The piston 36, groove 40, ring 42, and wear surface 28 are sized for obtaining a first radial clearance $C_1$ between the wear surface 28 and the piston 42 which is defined by $(D_1-D_2)/2$. A second radial clearance $C_2$ is obtained between the piston ring 42 and the groove 40 when the ring 42 contacts the wear surface 28 as illustrated, and is defined by $D_1-2S$. In the preferred embodiment, the second radial clearance $C_2$ is less than the first radial clearance $C_1$ to ensure that only the piston ring 42, and not also the piston 36, contacts the wear surface 28. For example, the second radial clearance $C_2$ has a value preferably up to about 0.005 inches (0.127 mm) and the first radial clearance $C_1$ has a value which is preferably at least about 0.009 inches (0.229 mm). These clearances ensure that the piston 36 does not contact the wear surface 28 and also reduce transverse movement (i.e., $C_2$) of the piston 36 relative to the housing first section 26. This is preferred to reduce vibratory response of the tube coupling 18 for reducing, for example, vibratory bending loads in the tubes 16.

As illustrated in FIG. 4, the piston ring outer surface 44 is preferably arcuate in a transverse plane and has a radius of curvature R. In particular, the piston ring outer surface 44 is preferably a spherical section, i.e., a portion of a sphere, having curvature both around its circumference relative to the longitudinal centerline axis 24 and in a plane transverse thereto, as represented by the radius R. This curvature of the piston ring outer surface 44 is effective for reducing leakage between the piston ring outer surface 44 and the wear surface 28 and accommodates some axial misalignment of the first fitting 32 relative to the housing 22.

Figure 5:
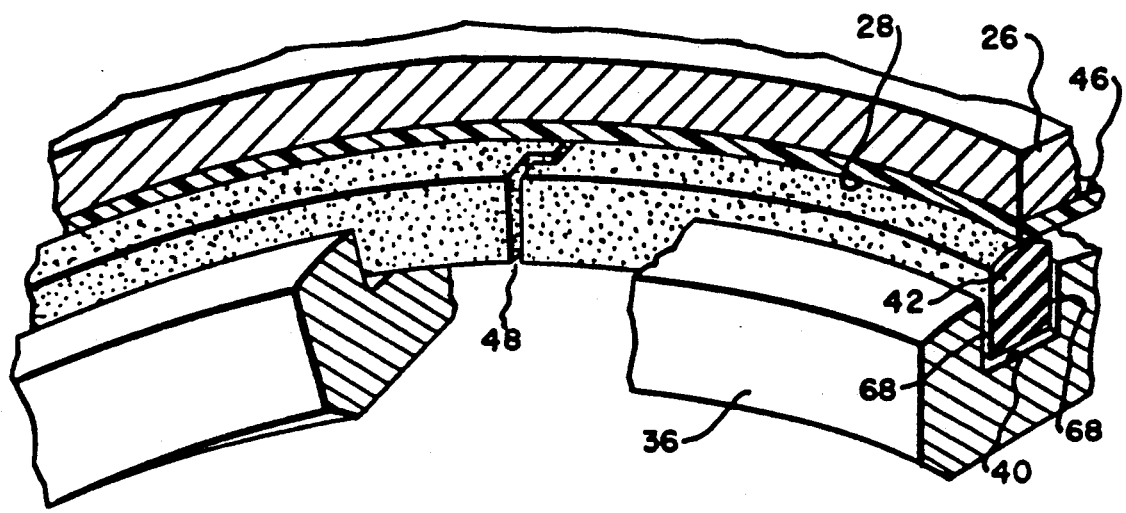
FIG. 5 is a partly sectional, end view of portions of the piston, piston ring, and adjacent housing of the coupling illustrated in FIG. 2.

As illustrated in FIG. 5, the piston ring 42 includes a single circumferential split 48 which allows the ring 42 to be expanded for insertion into and removal from the retaining groove 40. In order to minimize leakage at the split 48, the split 48 is preferably in the form of a conventional lap joint.

Referring again to FIG. 2, the housing first section 26 preferably further includes an annular storage portion 50 disposed between the wear surface 28 and the housing second section 30 which is sized for allowing the housing 22 to be retracted relative to the first fitting 32 so that the piston 36 is moveable from the wear surface 28 to the storage portion 50 for disassembling the housing 22 from the second channel 12. FIG. 3 illustrates the housing 22 in its retracted position. The storage portion 50 includes an inner surface 52 which faces and contacts the piston ring 42 in the retracted position, and a radially inwardly extending second flange 53 for contacting the piston 36 to limit retraction travel of the housing 22. The inner surface 52 may be disposed coextensively with the wear surface 28 for smoothly receiving the piston 36 when the housing 22 is retracted. In a preferred embodiment, the inner surface 52 is recessed radially outwardly from the wear surface 28 so that when the piston 36 is disposed in the retracted position the first radial clearance $C_1$ between the piston outer surface 28 and the storage portion inner surface 52 is larger than the clearance $C_1$ in the assembled position. This recess allows the piston ring 42 to expand slightly and provides a temporary axial retention of the housing 22 relative to the piston 36 for ease of assembly. The recess also allows the housing 22 to be skewed relative to the piston 36 and the centerline axis 24 in the housing retracted position to allow for easier alignment and insertion of the housing second section 30 into a complementary, tubular second fitting 54 joined in fluid communication with the second channel 12.

More specifically, the housing second section 30 is preferably removably joinable to the second fitting 54 which may be accomplished, for example, by including external threads 56 on the second section 30 and complementary internal threads 58 in the second fitting 54. The second fitting 54 includes an outer surface 60 which is fixedly connected to the second channel 12 by brazing or welding, for example, and provides a seal therewith. The external and internal threads 56 and 58 are conventional and are sized to ensure that when assembled, sealing contact therebetween is effected. A conventional sealing compound may be used on the threads 56 and 58 to improve sealing therebetween, if desired.

The housing 22 also includes wrenching means in the form of a plurality of circumferentially spaced apertures 62. The apertures 62 are preferably disposed in the housing first section 26 spaced axially from the first fitting 32 to provide relative ease of access and no interference with the first fitting 32. The apertures 62 are sized for receiving a conventional wrenching tool 64 as illustrated in FIG. 6. Wrenching tool 64 includes a pin 66 which is disposable in one of the apertures 62 so that the tool 64 can rotate the housing 22 for assembling and disassembling the housing 22 to the second fitting 54.

The housing 22 is illustrated in FIG. 3 in its retracted position wherein the housing storage portion 50 is axially sized to allow the housing 22 to be retracted completely away from the second fitting 54 so that an individual tube 16 may be inserted or removed between the adjacent first and second channels 10 and 12 without requiring movement of the first and second channels 10 and 12, or bending of the tube 16. Upon assembly, the storage portion inner surface 52 provides the above described recess which allows the housing 22 increased angular movement relative to the centerline axis 24 to allow the external threads 56 to be more easily aligned with the internal threads 58 for assembly of the housing 22 to the second fitting 54. The wrenching tool 64 is used for rotating the housing 22 for engaging the threads 56 and 58 for securing the housing 22 to the second fitting 54.

Accordingly, the tube coupling 18 in accordance with the invention accommodates relative axial movement between the housing 22 and the tube 16 by the use of the piston 36 having the piston 42 in sliding contact with the wear surface 28. The piston ring 42 accommodates axial movement while maintaining an effective seal between the piston 36 and the wear surface 28. Leakage of the fluid 24 around the piston ring 42 and through the retaining groove 40 may be minimized by providing relatively small axial gaps W, for example about 0.0012 inches (0.030 mm), between side surfaces 68 of the ring 42 and the groove 40 as illustrated in FIG. 4. Furthermore, the housing storage portion 50 allows for additional axial movement between the housing 22 and the piston 36 so that the housing second section 30 may be completely retracted away from the second fitting 54 to allow for disassembly of an individual tube 16. In an alternate embodiment, the wear surface 28 can simply be extended in lieu of providing a separate storage portion 50.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A coupling for joining first and second channels in fluid communication comprising:
   a tubular housing having a longitudinal centerline axis, a first section having an annular radially inwardly facing wear surface, an integral second section for being removably joined in fluid communication with said second channel, and an annular storage portion disposed between said wear surface and said second section;
   a tubular first fitting having a first flange for being joined in fluid communication with said first channel, an integral piston have a radially outer surface including a U-shaped retaining groove extending therein circumferentially around said piston;
   a piston ring slidably disposed in said piston groove and forming axial gaps therewith sized for reducing leakage of fluid around said piston ring and through said groove;
   said piston being disposed radially inwardly of said wear surface so that said piston ring contacts said wear surface for forming a seal therewith and said housing is joined to said first fitting only by said piston ring; and
   said annular storage portion being sized for allowing said tubular housing to be retracted relative to said first fitting so that said piston is moveable from said wear surface to said annular storage portion for disassembling said tubular housing from said second channel.

2. A coupling according to claim 1 wherein said housing first section and said wear surface are sized to allow said piston ring to slide on said wear surface over a predetermined axial range parallel to said centerline axis.

3. A coupling according to claim 1 wherein said wear surface includes a wear coating thereon and said piston ring contacts said wear coating for reducing abrasive wear between said wear coating and said piston ring.

4. A coupling according to claim 1 wherein said wear surface, piston, piston groove and piston ring are sized for allowing contact only of said piston ring with said wear surface.

5. A coupling according to claim 1 wherein said piston ring further includes an outer surface for contacting said wear surface, said piston ring outer surface being a spherical section.

6. A coupling according to claim 1 wherein said piston ring further includes an outer surface for contacting said wear surface, said piston ring outer surface being arcuate in a transverse plane.

7. A coupling according to claim 1 wherein said piston ring includes a single circumferential split.

8. A coupling according to claim 1 wherein said storage portion includes an inner surface recessed from said wear surface for receiving said piston when said housing is retracted, and a radially inwardly extending second flange for contacting said piston to limit retraction travel of said housing.

9. A coupling according to claim 1 further including a tubular second fitting for being joined in fluid communication with said second channel, and wherein said housing second section is removably joinable to said second fitting.

10. A coupling according to claim 1 wherein:
said housing first section and said wear surface are sized to allow said piston ring to slide on said wear surface over a predetermined axial range parallel to said centerline axis; and
further including a tubular second fitting for being joined in fluid communication with said second channel, wherein said housing second section is removably joinable to said second fitting, and said storage portion is sized also to allow said housing to be retracted completely away from said second fitting for assembling and disassembling said housing to said second fitting.

11. A coupling according to claim 10 wherein:
said storage portion includes an inner surface recessed from said wear surface for receiving said piston when said housing is retracted, and a radially inwardly extending second flange for contacting said piston to limit retraction travel of said housing;
said housing second section extends axially from said second flange; and
said second fitting includes internal threads and said housing second section includes complementary external threads for threading said second section into said second fitting in sealing contact therewith.

12. A coupling according to claim 4 wherein:
said housing first section includes an inside diameter $D_1$ at said wear surface;
said piston includes an outside diameter $D_2$;
said piston retaining groove includes an inside diameter $D_3$;
said piston ring includes a radial thickness S;
said piston, groove, ring, and wear surface are sized for obtaining a first radial clearance $C_1$ between said wear surface and said piston defined by $(D_1-D_2)/2$ and a second radial clearance $C_2$ between said piston ring and said groove defined by $D_1-2S$; and
said second radial clearance $C_2$ is less than said first radial clearance $C_1$.

13. A coupling according to claim 7 wherein said piston ring split is in the form of a lap joint.

14. A coupling according to claim 9 wherein said second fitting includes internal threads and said housing second section includes complementary external threads for threading said second section into said second fitting in sealing contact therewith.

15. A coupling according to claim 9 further including wrenching means for rotating said housing relative to said second fitting.

16. A coupling according to claim 15 wherein said wrenching means includes a plurality of circumferentially spaced apertures disposed in said housing first section, said apertures being sized for receiving a wrenching tool for rotating said housing to assemble and disassemble said housing to said second fitting.

17. A coupling according to claim 11 wherein:
said housing first section includes an inside diameter $D_1$ at said wear surface;
said piston includes an outside diameter $D_2$;
said piston retaining groove includes an inside diameter $D_3$;
said piston ring includes a radial thickness S;
said piston, groove, ring, and wear surface are sized for obtaining a first radial clearance $C_1$ between said wear surface and said piston defined by $(D_1-D_2)/2$ and a second radial clearance $C_2$ between said piston ring and said groove defined by $D_1-2S$; and
said second radial clearance $C_2$ is less than said first radial clearance $C_1$.

18. A coupling according to claim 12 wherein said second radial clearance $C_2$ is up to about 0.005 inches (0.127 mm).

19. A coupling according to claim 18 wherein said first radial clearance $C_1$ is at least about 0.009 inches (0.229 mm).

20. A coupling according to claim 17 wherein said wear surface includes a wear coating thereon and said piston ring contacts said wear coating for reducing abrasive wear between said wear coating and said piston ring.

* * * * *